United States Patent
Webb et al.

(10) Patent No.: US 8,477,099 B2
(45) Date of Patent: Jul. 2, 2013

(54) PORTABLE DATA PROCESSING APPARTATUS

(75) Inventors: Jonathan Webb, London (GB); Matthew Brooks, London (GB); Greame Ankers, London (GB); Peter John Marshall, London (GB)

(73) Assignee: Sony Computer Entertainment Europe Limited (GB)

( * ) Notice: Subject to any disclaimer, the term of this patent is extended or adjusted under 35 U.S.C. 154(b) by 266 days.

(21) Appl. No.: 12/979,661

(22) Filed: Dec. 28, 2010

(65) Prior Publication Data

US 2011/0157017 A1 Jun. 30, 2011

(30) Foreign Application Priority Data

Dec. 31, 2009 (EP) .................................. 09181051

(51) Int. Cl.
*G06F 3/033* (2006.01)
(52) U.S. Cl.
USPC .............................. 345/158; 345/157; 382/291
(58) Field of Classification Search
USPC .................... 345/156–184, 633; 382/286–292
See application file for complete search history.

(56) References Cited

U.S. PATENT DOCUMENTS

| | | | | |
|---|---|---|---|---|
| 7,002,551 B2 * | 2/2006 | Azuma et al. | ................. | 345/158 |
| 7,193,636 B2 * | 3/2007 | Satoh | ............................ | 345/633 |
| 7,489,806 B2 * | 2/2009 | Mohri et al. | .................... | 382/107 |
| 7,586,502 B2 * | 9/2009 | Festejo et al. | ................. | 345/634 |
| 7,587,295 B2 * | 9/2009 | Satoh | ............................ | 702/150 |
| 7,778,792 B2 * | 8/2010 | Huang et al. | ................... | 702/141 |
| 7,833,152 B2 * | 11/2010 | Chatenever et al. | .......... | 600/117 |
| 7,918,733 B2 * | 4/2011 | Zalewski et al. | ................ | 463/39 |
| 8,035,613 B2 * | 10/2011 | Festejo et al. | ................. | 345/156 |
| 8,135,066 B2 * | 3/2012 | Harrison et al. | ......... | 375/240.16 |
| 2002/0161280 A1 * | 10/2002 | Chatenever et al. | .......... | 600/112 |
| 2003/0202089 A1 * | 10/2003 | Alhadef et al. | ................. | 348/42 |
| 2004/0051680 A1 * | 3/2004 | Azuma et al. | ..................... | 345/8 |
| 2005/0008256 A1 * | 1/2005 | Uchiyama et al. | ............. | 382/291 |
| 2005/0027167 A1 * | 2/2005 | Chatenever et al. | .......... | 600/173 |
| 2006/0035710 A1 * | 2/2006 | Festejo et al. | ................... | 463/36 |
| 2006/0038819 A1 * | 2/2006 | Festejo et al. | ................. | 345/530 |
| 2006/0227103 A1 * | 10/2006 | Koo et al. | ...................... | 345/156 |
| 2007/0035562 A1 * | 2/2007 | Azuma et al. | ................. | 345/633 |
| 2007/0165942 A1 * | 7/2007 | Jin et al. | ......................... | 382/154 |

(Continued)

OTHER PUBLICATIONS

You S et al: "Fusion of vision and gyro tracking for robust augmented reality registration", Proceedings IEEE 2001 Virtual Reality. (VR). Yokohama, Japan, Mar. 13 20010101 Los Alamitos, CA, IEEE COMPo Soc, US LNKD-DOI:10.1109/VR.2001.913772, Jan. 1, 2001, pp. 71-78, XP031172752.*

*Primary Examiner* — Dmitriy Bolotin
(74) *Attorney, Agent, or Firm* — Lerner, David, Littenberg, Krumholz & Mentlik, LLP

(57) ABSTRACT

A portable data processing apparatus is provided. It has at least one data processing function which depends on detected motion of the apparatus. The apparatus comprises a video camera operable to capture successive images of a part of the real environment around the apparatus; a video motion detector operable to detect motion of the apparatus by analysis of image motion between pairs of captured images; a hardware motion detector operable to detect motion of the apparatus, whereby the data processing function depends on motion detected by the hardware motion detector; and a controller operable to adjust the operation of the hardware motion detector if the motion detected by the video motion detector and the motion detected by the hardware motion detector differ by at least a threshold difference.

15 Claims, 10 Drawing Sheets

U.S. PATENT DOCUMENTS

| | | | |
|---|---|---|---|
| 2008/0031327 A1* | 2/2008 | Wang et al. | 375/240.12 |
| 2008/0280676 A1* | 11/2008 | Distanik et al. | 463/29 |
| 2009/0010335 A1* | 1/2009 | Harrison et al. | 375/240.16 |
| 2009/0290759 A1* | 11/2009 | Stevens et al. | 382/106 |
| 2009/0325703 A1* | 12/2009 | Suzuki et al. | 463/37 |
| 2009/0326816 A1* | 12/2009 | Park et al. | 701/213 |
| 2009/0326850 A1* | 12/2009 | Ohta | 702/95 |
| 2010/0045701 A1* | 2/2010 | Scott et al. | 345/633 |
| 2010/0265069 A1* | 10/2010 | Michaels et al. | 340/572.3 |
| 2011/0280473 A1* | 11/2011 | Shiba | 382/154 |
| 2012/0242794 A1* | 9/2012 | Park et al. | 348/46 |

* cited by examiner

PORTABLE DATA PROCESSING APPARTATUS

CROSS REFERENCE TO RELATED APPLICATIONS

The present application claims the benefit of and priority to EP Application No. 09181051.5, filed Dec. 31, 2009, the entire disclosure of which is incorporated by reference herein.

BACKGROUND OF THE INVENTION

1. Field of the Invention

The present invention relates to a portable data processing apparatus.

2. Description of the Prior Art

Data processing operations associated with portable data processing apparatus, such as music players, mobile telephones or games machines, can be controlled in response to motion of the whole apparatus.

Motion is often detected in portable apparatus using an accelerometer. A typical accelerometer is a small micro electro-mechanical systems (MEMS) device comprising a sprung cantilever beam with a mass supported at the free end of the beam. Damping of the motion of the beam and mass is provided by residual gas sealed in the device. Under the influence of an external acceleration (e.g. an acceleration of the apparatus in which the accelerometer is provided), the mass deflects from a neutral position. This deflection is measured using known analogue or digital techniques, for example by detecting the capacitance between one or more fixed electrodes and one or more beams attached to the mass.

The use of accelerometers is cheap and reasonably reliable. However, they suffer from the drawback that the results obtained from the accelerometer (i.e. a signal or value indicative of acceleration at a certain instant) must be integrated in order to obtain a signal or value indicative of speed, and this must in turn be integrated in order to obtain a signal or value indicative of position of the apparatus.

Similar factors apply to the detection of rotational motion (leading to a detection of orientation) using gyroscopes. The gyroscope's output must be integrated in order to obtain a signal or value indicative of current orientation.

Integration processes can tend to introduce drift in the output signal or value, because any errors or noise in the original data are also integrated, so that their effect on the accuracy of the output signal or value increases over time.

This is not a particular problem in some situations. For example, certain music players allow the user to change to a new music track or change replay volume by making a sudden flicking movement of the music player. The detection of such a movement is not particularly affected by problems of signal integration—in fact, the raw acceleration information can be tested directly to detect that type of movement.

However, in applications such as portable computer games machines, sometimes the current position and/or orientation of the machine is used as a control input to the game. For example, the machine could be treated as a type of steering wheel, so that movements of the machine cause changes in direction of a car within the game environment. Or the machine could act as a type of gun sight, so that movements of the machine change the aim of a gun in the virtual environment. In instances like these, a tendency for the motion detection to drift or, more generally, to be incorrect would be subjectively disturbing for the machine's user.

It is an object of the present invention to mitigate or alleviate the above problems.

SUMMARY OF THE INVENTION

This invention provides a portable data processing apparatus having at least one data processing function which depends on detected motion of the apparatus, the apparatus comprising:

a video camera operable to capture successive images of a part of the real environment around the apparatus;

a video motion detector operable to detect motion of the apparatus by analysis of image motion between pairs of captured images;

a hardware motion detector operable to detect motion of the apparatus, whereby the data processing function depends on motion detected by the hardware motion detector; and a controller operable to adjust the operation of the hardware motion detector if the motion detected by the video motion detector and the motion detected by the hardware motion detector differ by at least a threshold difference.

The invention advantageously allows a hardware motion detection (e.g. via one or more accelerometers) to be validated and, if appropriate, altered by comparison with motion detection by video image analysis.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 9A to 9E schematically illustrate an image stabilisation process;

DESCRIPTION OF THE PREFERRED EMBODIMENTS

In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1A:
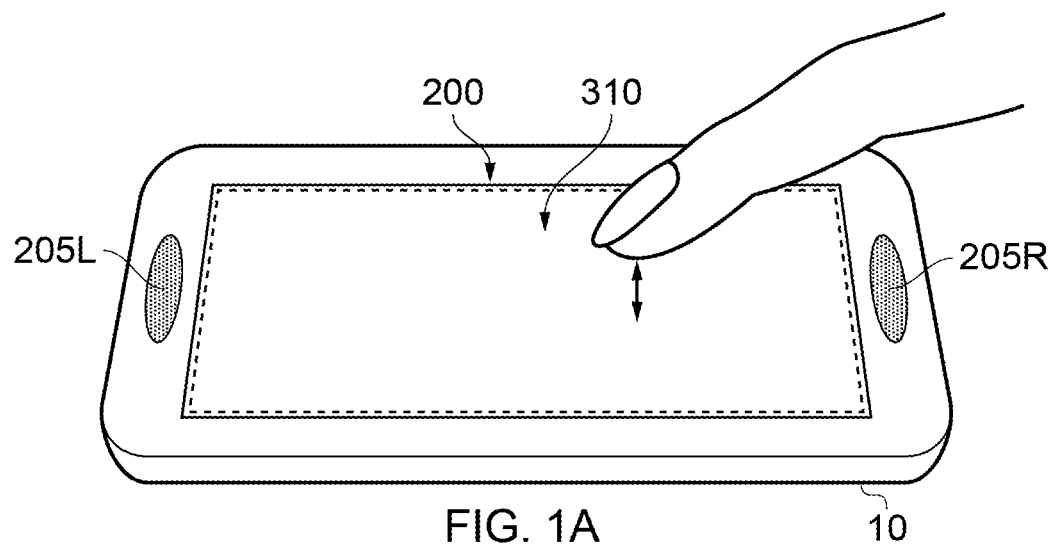
FIGS. 1A and 1B are schematic diagrams of a portable electronic device in accordance with an embodiment of the present invention.
Figure 1B:
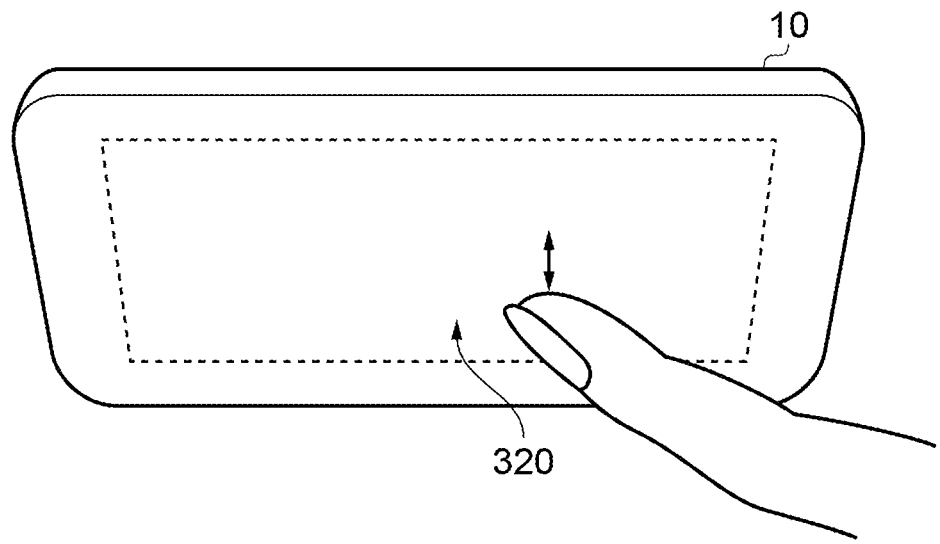

FIGS. 1A and 1B illustrate an embodiment of a portable electronic device (PED) 10. FIG. 1A shows a notional front or top face of the PED, whilst FIG. 1B shows a notional rear or bottom face of the PED. The front and rear faces are substantially parallel to one another.

On the front face, the PED comprises a display 200 and optionally one or more loudspeakers 205L, 205R.

On the rear face, the PED optionally comprises a rear touch sensitive surface 320 (indicated by the dotted lines) having similar dimensions to the display 200. The rear touch sensitive surface is positioned so as to be substantially aligned with the display. That is to say, considered in a direction normal to the plane of the display, the rear touch sensitive surface substantially overlies the display.

Optionally, a transparent front touch sensitive surface 310 (indicated by the dotted lines in FIG. 1A) is also provided coincident with the display 200. The front and rear touch sensitive surfaces and the display thus have similar dimensions and placements on their respective faces of the device. The touch sensitive surfaces also have a similar resolution of touch localisation.

Figure 2:
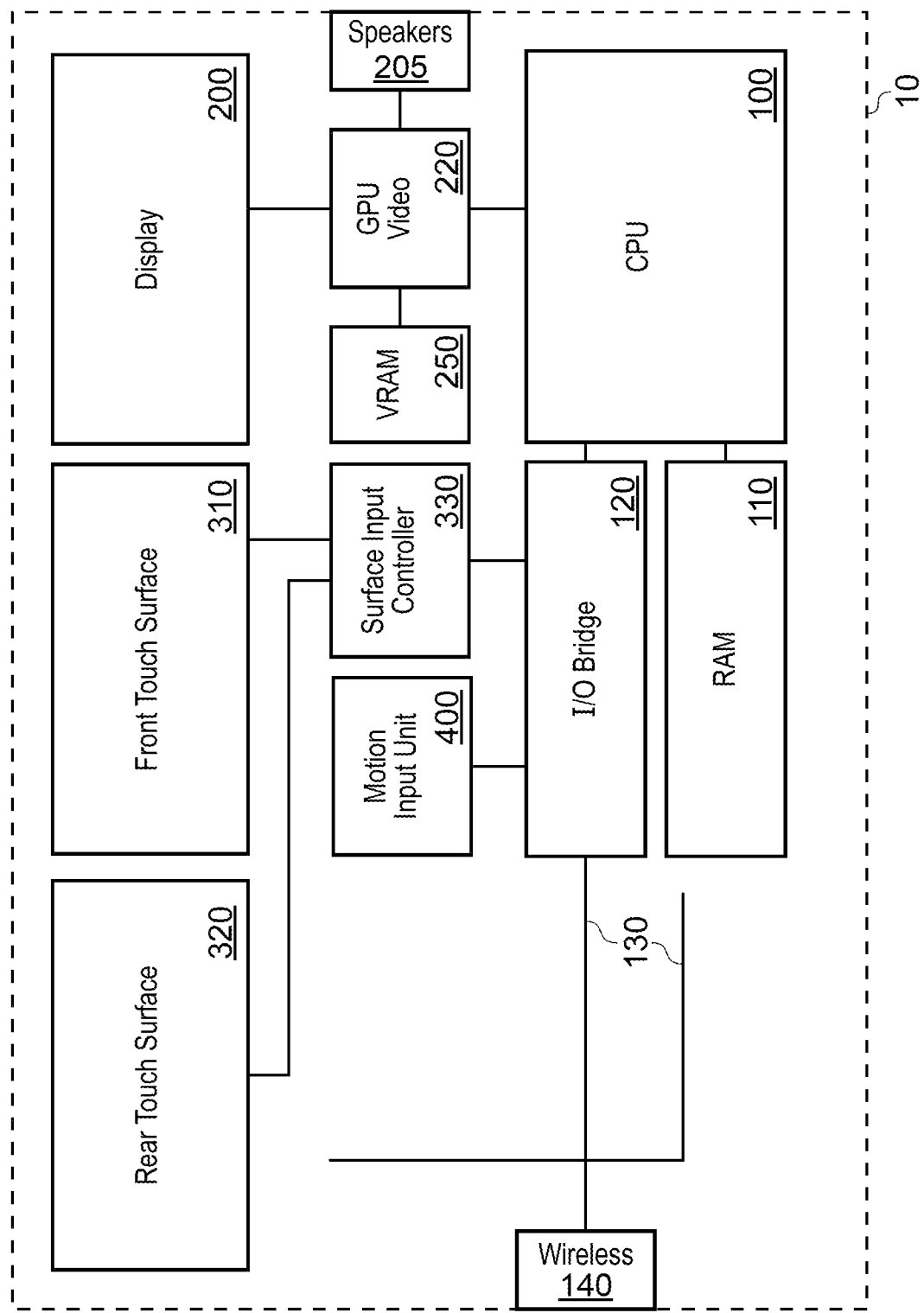
FIG. 2 is a schematic diagram of a portable electronic device in accordance with an embodiment of the present invention.

Referring now to FIG. 2, an embodiment of the PED comprises a central processor (CPU) 100 coupled to random access memory (RAM) 110, and optionally to a read only memory (not shown). In addition the CPU communicates with a graphics processing unit (GPU) 220. The GPU has access to video RAM (VRAM) 250. The GPU outputs audio to loudspeakers 205L,R (only one shown for clarity) and/or to a headphone jack socket (not shown). The GPU also outputs video information to the display 200. The display is typically a liquid crystal display (LCD) but may be an organic light emitting diode display (OLED) or similar suitable display technology. The PED can operate as a games machine, and in operation the CPU and GPU can, under suitable software instruction, generate a virtual environment (such as a game environment) or a part of such a virtual environment, for display either on its own as a virtual reality or as part of a display of augmented reality.

In addition, the CPU communicates with an input/output bridge (I/O bridge) 120 that co-ordinates communication with peripheral components both integral to and linkable with the PED. In an embodiment of the PED the I/O bridge communicates with a surface input controller 330, which parses inputs from the rear touch sensitive surface 320 and optionally the transparent front touch sensitive surface 310. The I/O bridge also communicates with a motion input unit 400 comprising one or more micro electromechanical (MEMS) accelerometers and/or gyroscopes, to provide up to six axes of motion input (x, y and z axis lateral movement and roll, pitch and yaw rotational movement). The I/O bridge also communicates with a bus 130, upon which various peripheral devices may be linked, including one or more wireless communication units 140, such as for example WiFi and/or Bluetooth® communication units.

It will be appreciated that the CPU 100 may be a single core or multi core processor. Similarly, the RAM may be dynamic RAM or may comprise both dynamic RAM and static (e.g. flash) RAM units. Likewise, whilst the GPU typically uses dedicated VRAM, alternatively or in addition it may share common RAM with the CPU. Finally, it will be appreciated that the function of the surface input controller 330 may be performed by the CPU itself.

The optional rear touch sensitive surface may be a conventional capacitance touchpad or panel such as that found in laptop computers or portable telephones. Such a touchpad typically comprises two layers of parallel conductive lines separated by an insulator and arranged at right angles to one another. A high frequency signal is swept through every respective pairing of lines between the two layers. The measurable current for each pair is then proportional to the capacitance at their point of intersection. When a user's finger is placed at or near that intersection, however, some of the electrical field between layers is shunted to ground, changing the effective capacitance and hence the measured current. Precise localisation of the user's finger can be achieved by measuring changes in capacitance at nearby points of intersection, which will be proportional to their respective distances from the finger. So-called multi-touch operation of the touchpad can be achieved by detecting distinct peaks in capacitance change at separate intersection points on the pad. Meanwhile, movement of a user's finger or fingers can be estimated from successive points of intersection where contact is detected.

The optional front touch sensitive surface for use with the display operates in a similar manner to the rear touch sensitive surface, but in this instance the conductive lines are typically transparent (as a non limiting example, being formed by a deposition of indium tin oxide), and the insulator between two layers is provided by all or part of the display window (e.g. a glass layer); typically a further transparent protective layer is then provided on top of the upper conductive layer.

It will be appreciated however that any suitable touch sensitive technique may be used for either touch panel.

It will also be appreciated that whilst not shown in the figures for the purposes of clarity, the PED comprises power distribution lines to various components and one or more sources of power, such as an input socket (for example a conventional DC power socket, or alternatively or in addition a USB socket). Such an input socket may also be used to charge one or more batteries (also not shown). Such batteries may be user removable or may be sealed in the device. Other components not shown include, for example, an optional microphone.

Figure 3:
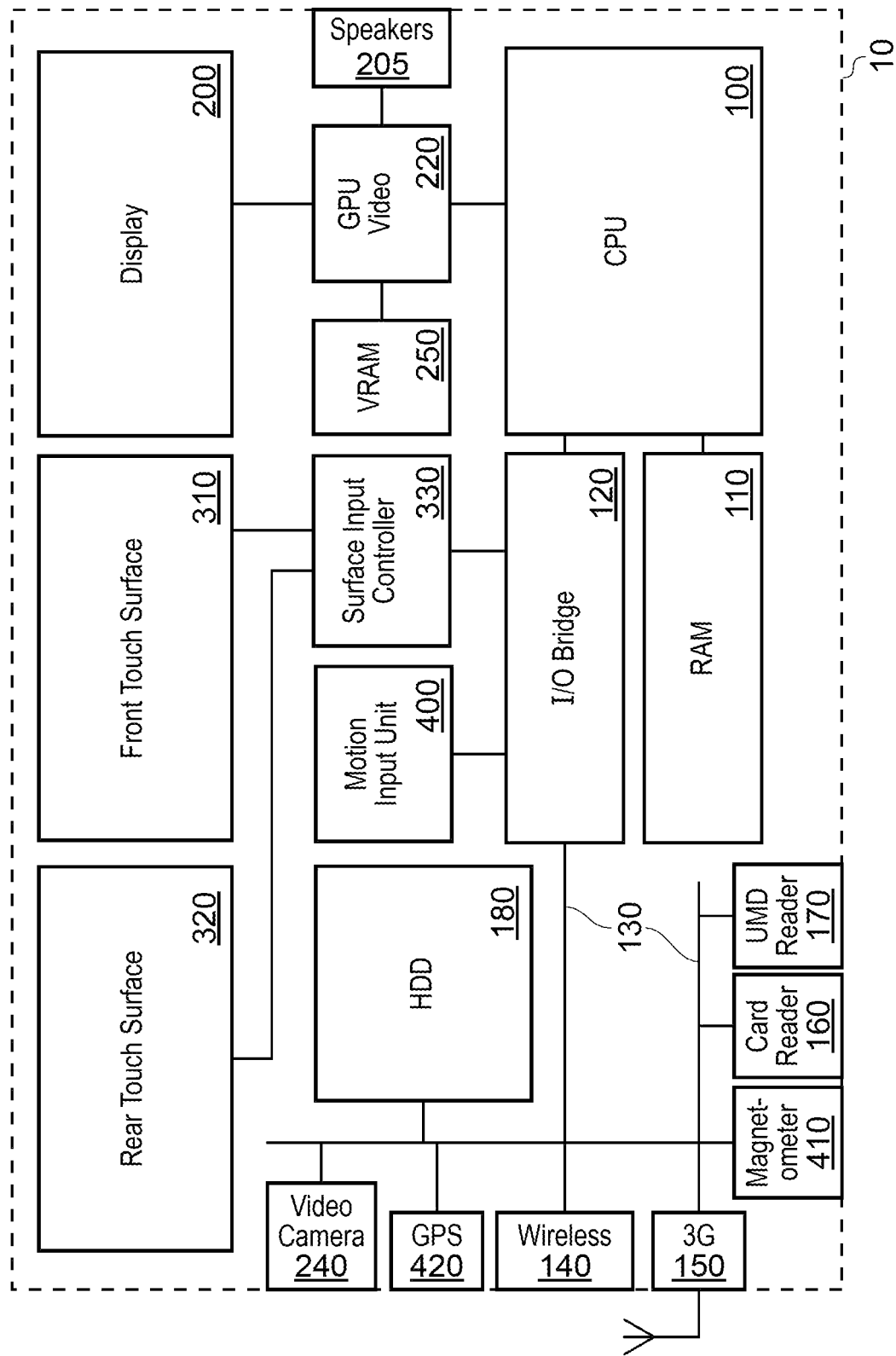
FIG. 3 is a schematic diagram of a portable electronic device in accordance with an embodiment of the present invention.

Referring now also to FIG. 3, an embodiment of the PED may comprise one or more additional components, either integrated within the device or connectable to it. Such additional components include, but are not limited to, the following.

a) A card reader 160 suitable for reading from and optionally writing to memory cards, such as a Sony® Memory Stick® card, or alternatively legacy memory cards such as those used by the Sony® Playstation 2® entertainment device. Such a reader may be integral to the PED or may connect to the bus 130 via a USB connection.

b) A universal media disk (UMD) reader 170 or other optical disk reader (such as a DVD or Blu-Ray® disk reader), for accessing media and/or game content stored thereon. Such a reader may be removably connectable to the bus 130 via a USB or proprietary connection.

c) A magnetometer 410 for determining compass direction (i.e. the current absolute orientation of the PED), mounted integral to the PED either on the bus 130 or as part of the motion input unit 400.

d) A third generation (3G) or other mobile telephony module 150. In an embodiment, the module and aerial are integral to the PED, and optionally the aerial is shared with or otherwise coupled electromagnetically with other wireless units in the device for the purpose of transmission and reception. Alternatively the module may be removably connectable to the PED, for example via USB port or a Personal Computer Memory Card International Association (PCMCIA) slot.

e) A hard disk drive (HDD) 180 integral to the PED, providing bulk storage for audio/video media, downloaded games, and the like.

f) A GPS receiver 420. Again the GPS receiver may share an aerial with one or more other wireless units (such as WiFi) within the PED, or may use its own aerial. Map information, where used, may be stored locally at the receiver, or in flash RAM of the PED, or on an HDD of the PED.

g) A video camera 240, typically comprising a charge coupled device (CCD) optical sensor and suitable optics for imaging onto the CCD, arranged to capture successive images of a part of the real environment surrounding the PED. The resolution of the CCD may for example be 640×480 pixels, but may be any suitable resolution, such as for example 1920×1080 pixels (full HD). In an embodiment the video camera is integral to the PED, but alternatively may be removably connectable to the bus 130 via a USB or proprietary connection. In the description below, it will be assumed that if indeed the camera is removable, its current condition is that it is mounted to the PED.

In operation, the CPU accesses an operating system that is resident for example on a ROM, flash RAM or a hard disk. The operating system co-ordinates operation of the various functions of the PED and presents a user interface to a user of the device. The user interface will typically comprise graphical outputs via the display and touch based and/or motion-based inputs, but may also include audio outputs and/or inputs.

Where a rear touch panel is provided, touch based inputs to the PED are peculiar to the arrangement of a display on the front of the PED and a correspondingly positioned touch sensitive surface (or 'panel') on the rear of the PED. This allows the user to treat the rear panel as a proxy for the display (in other words, address actions and inputs to the rear touch panel as if to the display, and/or point to the rear panel in order to point to the display). Thus for example, the user can point to icons or other displayed features from apparently underneath the display by touching the rear touch panel at the corresponding position.

It will be appreciated that unlike a laptop touch panel, the rear touch panel can have a substantially 1:1 scale relationship with the screen, thereby not just enabling motion of a mouse pointer on screen that corresponds to motion of touch on the panel (for example), but furthermore also enabling direct placement of such a mouse on the screen at the position corresponding to the touch on the panel, because as noted above the panel can be understood to represent the screen (i.e. act as a proxy). In other words, the rear touch panel has substantially the same size, shape and orientation as the screen. However, it is possible in other embodiments that the rear touch panel could have a different size, for example being smaller than the screen. In this arrangement, however, maintaining substantially the same shape and orientation as the screen means that the user can easily relate portions of the rear touch panel to corresponding screen positions. If the rear touch panel is smaller than the screen it does not have to be positioned on the device symmetrically behind the screen, but it can aid use of the device if the rear touch panel at least mainly overlaps the screen position.

Because of the relative orientation of the display and the rear touch panel, left-to-right mapping across the rear touch panel is therefore reversed to correspond to the appropriate position on the display. This means that detection of a movement in a certain side to side direction (as viewed when looking at the back of the device) has to be reversed in order that the movement can be applied to a screen event which is viewed from the front of the device. In other words, a left to right movement (as viewed from the rear) actually corresponds to a right to left movement as viewed from the front of the device. The user, holding the device so that the screen is facing him, perceives that he is moving his finger from right to left along the rear touch panel, but the panel itself, facing away from the user, detects this movement as a left to right movement. This movement detection is therefore reversed before being applied to a screen event, in order that the screen event (e.g. moving a cursor) occurs from right to left as seen by the user.

Optionally this direction reversal is switchable depending on the orientation of the device as detected by the motion input unit, and/or according to what peripheral devices are connected; for example if the PED were connected to a television and then held display-down for use, the left-to-right mapping of the touch panel input may not be reversed because the rear touch panel would then in fact be on the top of the device, facing the user.

Use of the rear touch panel as a proxy for the display advantageously allows interaction with the graphical output of the device without the user's hand or fingers obscuring the display or marking the display window.

In addition, the subjective experience of controlling the displayed interface from behind or underneath the screen allows for new modes of user interaction; for example selection, highlighting or magnification of a screen element may be achieved by a user pushing the element 'toward' them (i.e. with finger pressure on the rear panel) from behind the device. For a capacitance based touch panel, an increase in pressure on the rear panel (i.e. a push) can be detected by a flattening of the user's finger, which results in a larger covered area and hence more points of intersection in the panel having reduced capacitance. Conversely a reduction in pressure reduces the number of intersection points where touch is detected.

In conjunction with a similar but transparent front touch sensitive surface overlaid on the display, further modes of interaction become possible. For example, displayed objects may be selected by being pinched between thumb and forefinger, with the thumb and forefinger touching the front and back touch panels respectively. The object may then be moved around, and, for example, activated by using a squeezing action between thumb and forefinger.

Further modes of interaction rely on the correspondence between position and/or motion of the user's fingers on the two touch panels. For example in a video playback application, stroking a finger across only the top touch panel may be interpreted as a fast-forward or rewind command (depending on direction), whilst a pinch hold followed by corresponding movement left or right of both fingers may be interpreted as selection of a specific point in playback (i.e. where the total playback time is scaled to the width of the touch panels). By contrast, however, a pinch hold followed by both fingers moving in opposite directions to one another may be interpreted as a twisting action, and adjusts a virtual volume dial. A similar grammar of interaction could be used for example for document or e-book navigation, with scrolling, page selection and zoom replacing the above playback functions.

Figure 4:
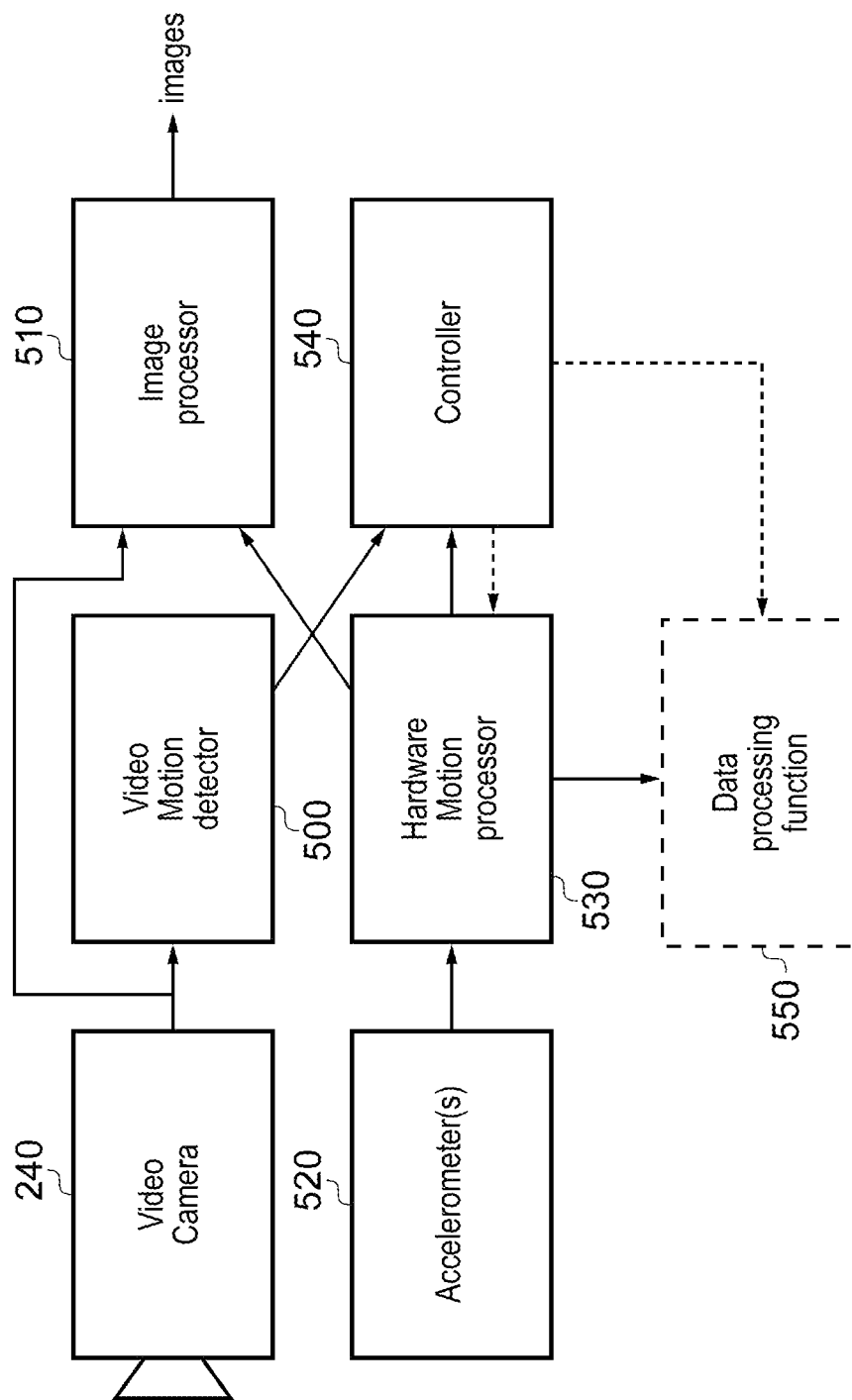
FIG. 4 is a schematic diagram illustrating motion detection operations of the portable electronic device.

FIG. 4 is a schematic diagram illustrating motion detection operations of the portable electronic device. FIG. 4 represents the same device as that described with reference to FIGS. 1 to 3; it is just that certain features of that device are explained in further detail.

FIG. 4 shows the video camera 240, a video motion detector 500, an image processor 510, one or more accelerometers 520, a hardware motion processor 530, a controller 540 and a schematic data processing function 550. In terms of correspondence with FIG. 3, the functions of the video motion detector 500 and the image processor 510 are carried out by the CPU 100 under software control. The accelerometer(s) 520, the hardware motion processor 530 and the controller 540 are collectively implemented by the motion input unit 400, possibly in cooperation with the CPU 100 under software control. The hardware motion processor and the accelerometer(s) may together be considered to be a hardware motion detector—the term hardware (shortened to H/W in some drawings) being used simply to indicate that motion is detected by the physical effect of motion on one or more electronic components rather than by analysis of video images, so detecting motion of the PED.

The data processing function 550 is simply a schematic representation of the fact that the detection of motion affects the data processing functions of the PED, for example the way in which a computer game is played with respect to its game environment or the way in which an image processing function such as those described below with respect to the image processor 510 are carried out. Hence, at least one data processing function may depend on detected motion of the apparatus. Motion data may be used, for example, as a control input to control (e.g. to steer) a game object such as a car within the game environment or to direct a gun sight of a gun within the game environment.

The video camera 240 captures successive images, separated by a frame period such as 40 milliseconds. The video motion detector 500 analyses (compares) successive pairs of adjacent captured images to detect net image motion between one image and the next. That is to say, inter-image motion of the whole of the image or a majority of the image is considered, rather than seeking individual small items which have moved relative to the rest of the image. This gives an indication of the motion of the PED, and using known techniques often called "optical flow" processing, the CPU 100 derives the position that the device would have had to have moved to, in order to account for the detected inter-image motion. The video motion detector passes data relating to motion derived in this way to the controller 540.

Images captured by the video camera 240 are also passed to the image processor 510, which processes them in one (or more) of a number of ways to be described below.

The hardware motion processor 530 receives data from one or more accelerometers. For example, three accelerometers may be used, each detecting respective orthogonal motion components (e.g. x, y and z direction components). These may be implemented as three separate devices, or one device with three sensing elements associated with it. The accelerometer(s) are known devices and the precise technical details of the accelerometer operation are not important to the present description. Similarly, the choice of a representation of three-dimensional motion is dependent upon the particular coordinate system being used, such as Cartesian coordinates, spherical coordinates or polar coordinates, but does not affect the technical operation of the device in any significant way.

The hardware motion processor derives motion data from the output of the accelerometer(s) and passes this data to the controller 540, to the image processor 510 and to the data processing function 550.

The operation of the hardware motion processor will now be described with reference to FIG. 5.

Figure 5:
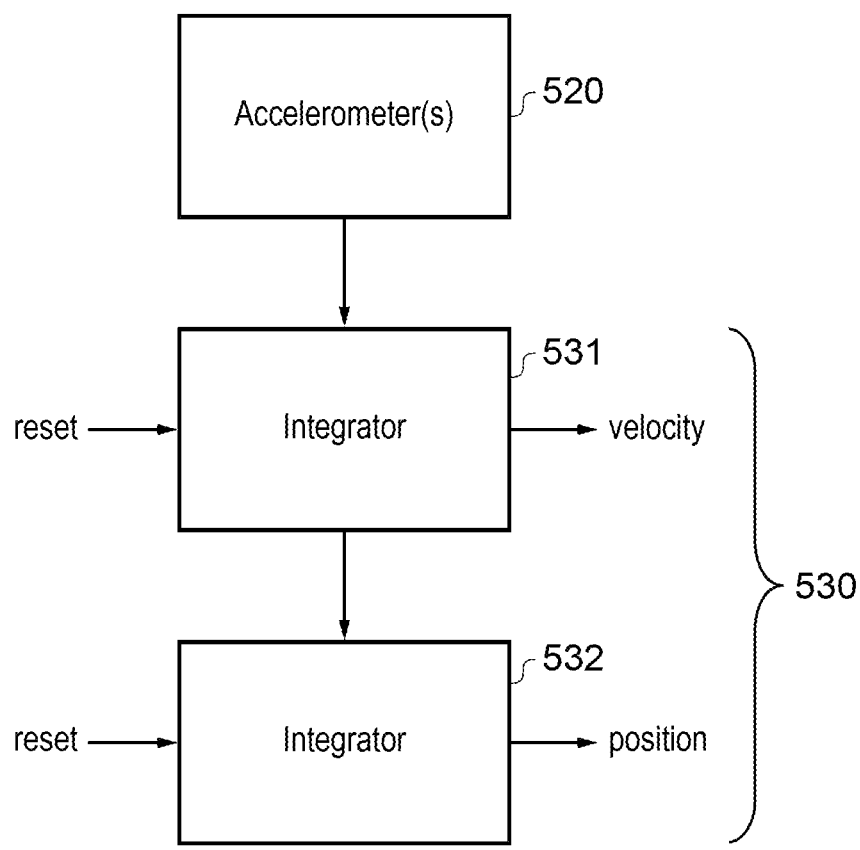
FIG. 5 schematically illustrates a hardware motion processor.

In FIG. 5, data or signals from the accelerometer(s) 520 are passed to a first integrator 531 which integrates them to derive velocity information. That output is also then passed to a second integrator which integrates the velocity information to derive positional information. The data processing function 550 and the image processor 510 use acceleration information, velocity information and/or position information as required for the particular application in use. The term "velocity" is used here in the sense of speed in an associated vector direction.

Figures 6, 7:
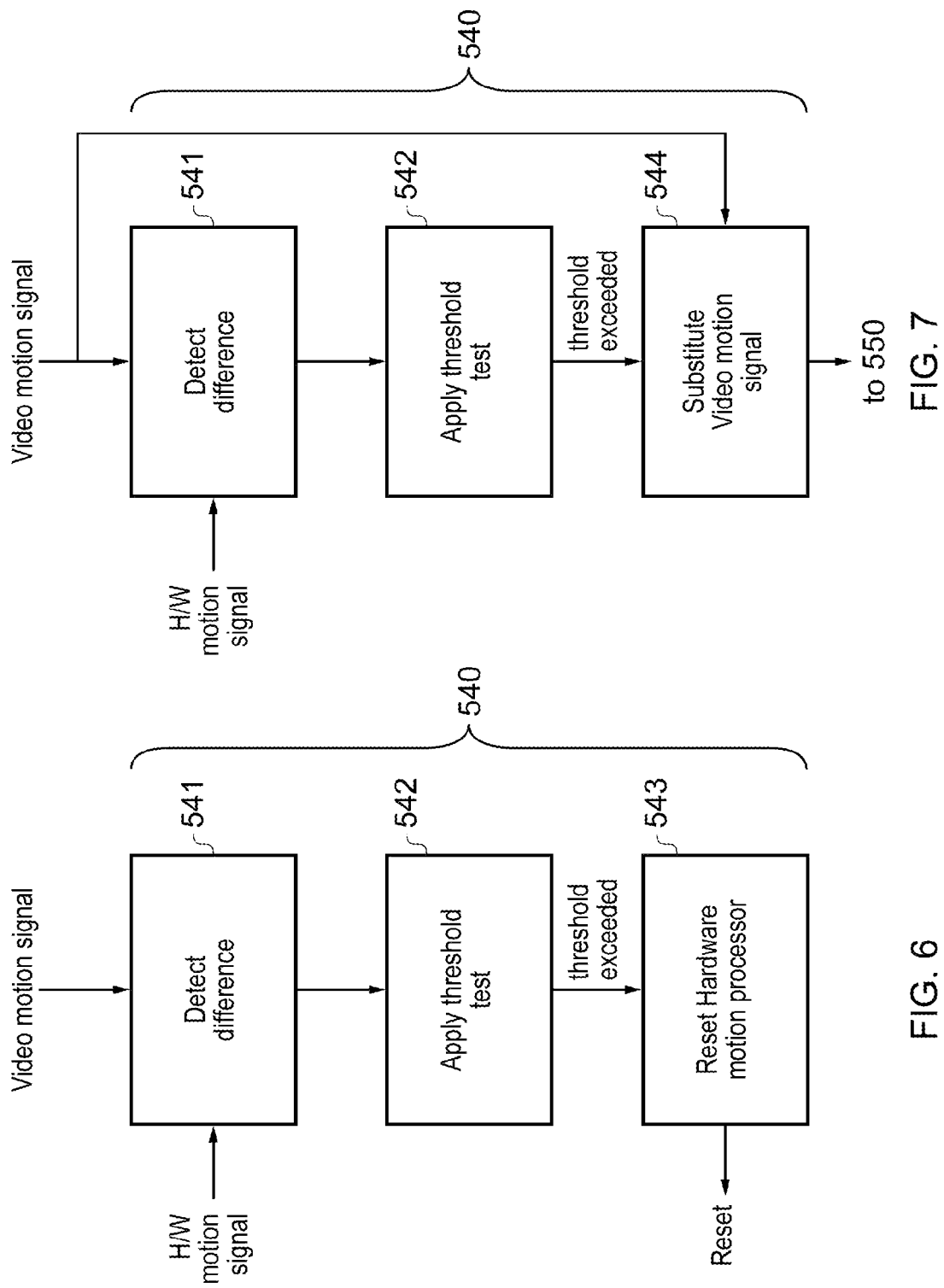
FIGS. 6 and 7 schematically illustrate embodiments of a controller.

FIGS. 6 and 7 schematically illustrate embodiments of the controller 540. Parts of the processing applied in the two embodiments are identical, but a final stage of processing differs between the two embodiments.

The controller 540 receives a video motion signal from the video motion detector 500 and a hardware motion signal from the hardware motion processor 530. A difference detector 541 detects the difference between the two measures of motion. An example of how this is achieved is described below with reference to FIG. 8. For now, it is sufficient to say that the difference may be expressed as any of an acceleration difference, a velocity difference and a positional difference. It is noted that a normal output from an optical flow process is a position or velocity signal, so if a comparison of accelerations were to be made, the video motion signal would be differentiated at least once. However, since a useful feature of the present arrangement is that it helps to detect drift and similar errors in signals integrated from accelerometer outputs, it is more useful to make the comparison with reference to velocity or position data.

In any event, a difference signal is passed to a threshold tester 542 which compares the difference with a threshold. Again, a detailed example of this process will be described with reference to FIG. 8 below.

The two embodiments of FIGS. 6 and 7 differ at this stage. In FIG. 6, if the motion difference exceeds the threshold (e.g. the motion detected by the video motion detector is less than the motion detected by the hardware motion detector by at least the threshold amount), then reset logic 543 signals a reset to the hardware motion processor. This has the effect of resetting the integrator 531 of FIG. 5, that is, forcing it to a condition indicative of zero or substantially zero motion. The reset signal can also optionally initiate a recalibration of the current output of the integrator 532—for example, setting the current position as output by the integrator 532 to indicate a notionally central position with reference to the game environment. Any velocity detections after that will lead to the integrator 532 integrating them with respect to that recalibrated position.

The embodiment of FIG. 7 employs substitution logic 544 which receives the video motion signal from the video motion detector 500 and substitutes it for the hardware motion signal. That is to say, the data processing function temporarily acts on the video motion signal in place of the hardware motion signal, for as long as a difference exceeding the threshold is detected.

The two arrangements of FIGS. 6 and 7 can in fact be used in combination, so the video motion signal is used until the reset process applied to the hardware motion processor has taken effect and the difference between the two motion signals has returned to a value below the threshold.

In any event, the effect of the controller 540 is to adjust the operation of the hardware motion detector if the difference between the hardware motion signal and the video motion signal is greater than a threshold amount. This adjustment can be, for example, to reset the hardware motion detector and/or to substitute a different motion signal for the output of the hardware motion detector.

It can also be useful to apply a further optional test to the arrangement of FIG. 6. That is to say, the two motion signals are compared to detect which is indicative of the larger motion. If the hardware motion signal indicates a larger motion than the video motion signal, then this could well indicate a drift problem with the integration process and so the reset function of the logic 543 is applied. If however the video motion signal is larger than the hardware motion signal, then the reset function is not applied.

Figure 8:
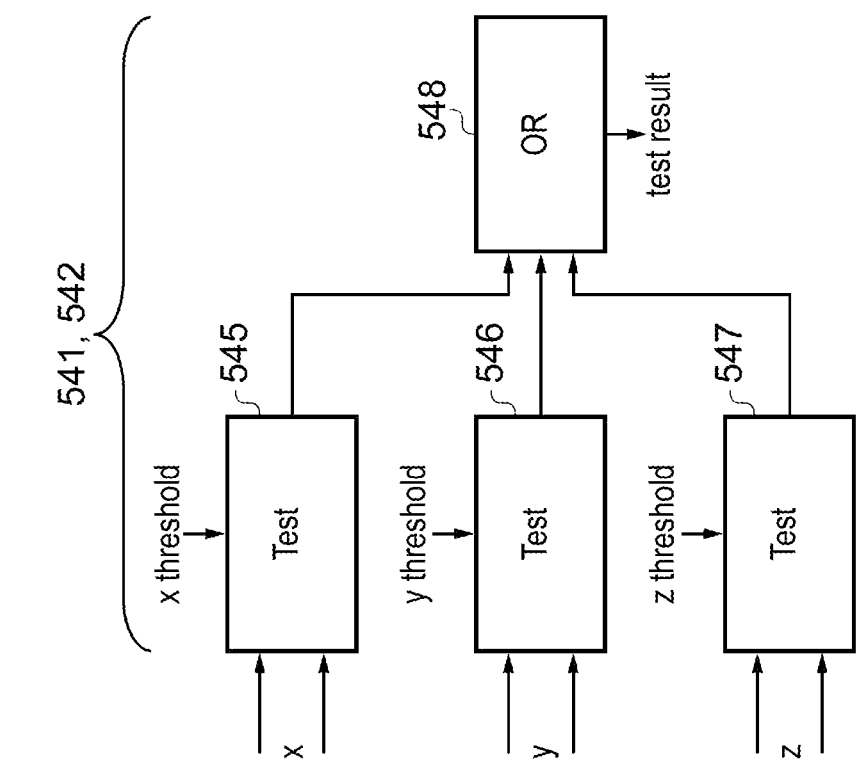
FIG. 8 schematically illustrates part of the operation of a controller.

FIG. 8 schematically illustrates part of the operation of a controller, in particular the operation of the difference detector 541 and the threshold tester 542.

As mentioned above, the comparison of motion (as between the video motion signal and the hardware motion signal) can be carried out on the basis of acceleration, velocity, position or combinations of these, but is more usefully carried out on either velocity or position. A combined signal can be tested, e.g. one representing the magnitude of the motion, but in the example of FIG. 8 the velocities are tested on a component basis, that is to say, the x, y and z motion components are separately tested. To achieve this, x, y and z velocity components of the two motion signals are supplied to respective testers 545, 546, 547 which compare the respective components by a simple subtraction. (In another embodiment, absolute values can be tested by a simple subtraction—this would allow for the possibility that the video motion detector and the hardware motion detector were operating accurately but in opposite senses, for example because the PED is being held upside down). The absolute value of each subtraction result is compared with a respective x, y and z threshold value. If the subtraction result is greater than the threshold in any one or more of the three motion component tests (i.e. in any one of the pair of corresponding motion components), as detected by an OR gate 548, then the motion difference is considered to have exceeded the threshold.

Optical flow motion detection techniques can give useful results in the image plane, that is, horizontally and vertically with respect to the camera, but are sometimes not as accurate or useful in the direction towards and away from the object in view (i.e. an axial direction with respect to the lens). So in embodiments of the invention the threshold for detecting a difference in motion along that axis is set to a larger value than the other thresholds, i.e. so that a greater difference in motion has to be detected before exceeding that particular threshold. In general, the various thresholds applied to different motion components can be the same or different to one another.

FIGS. 9A to 9E schematically illustrate an image processing operation (e.g. an image stabilisation process) as applied by the image processor 510 using motion information from the hardware motion processor 530.

Figure 9E:
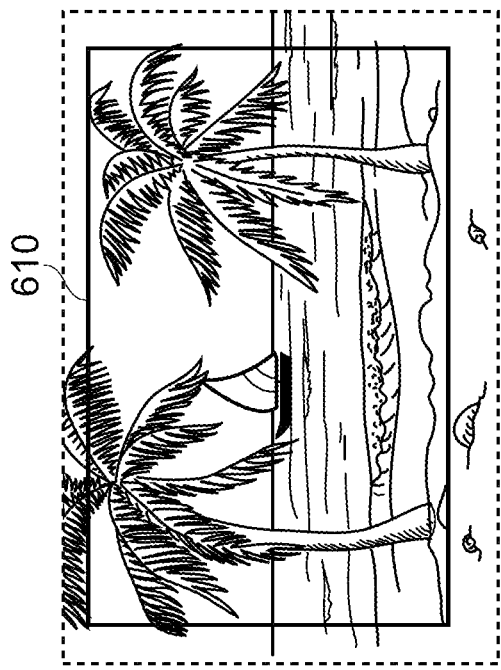
Figure 9E:
Figure 9E:
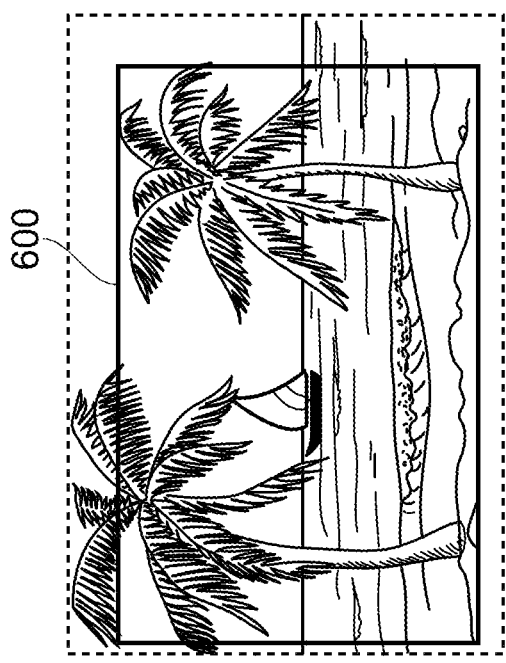
Figure 9E:

In particular, FIGS. 9A and 9B schematically illustrate two "raw" captured images, that is to say images in the exact form in which they are captured by the video camera. FIGS. 9C and 9D schematically illustrate corresponding output images after images stabilisation processing by the image processor 510. FIG. 9E schematically illustrates the motion of the PED (and therefore of the video camera) between the times t1 and t2 at which the two successive images were captured, and as measured by the hardware motion detector arrangement.

In the present example, the video camera is arranged to capture pixel information over a greater extent than the resolution of the required output images. This allows the image processor 510 to compensate, at least partially, for motion of the PED at the time the images were captured, as detected by the hardware motion detector arrangement, by selecting subareas of the raw captured images for output. In the example shown, the image processor changes the sub-areas so that a sub-area 600 is selected in the image of FIG. 9A and a sub-area 610 is selected in the image of FIG. 9B, in response to the direction and magnitude of the detected motion shown in FIG. 9E.

Figure 10:
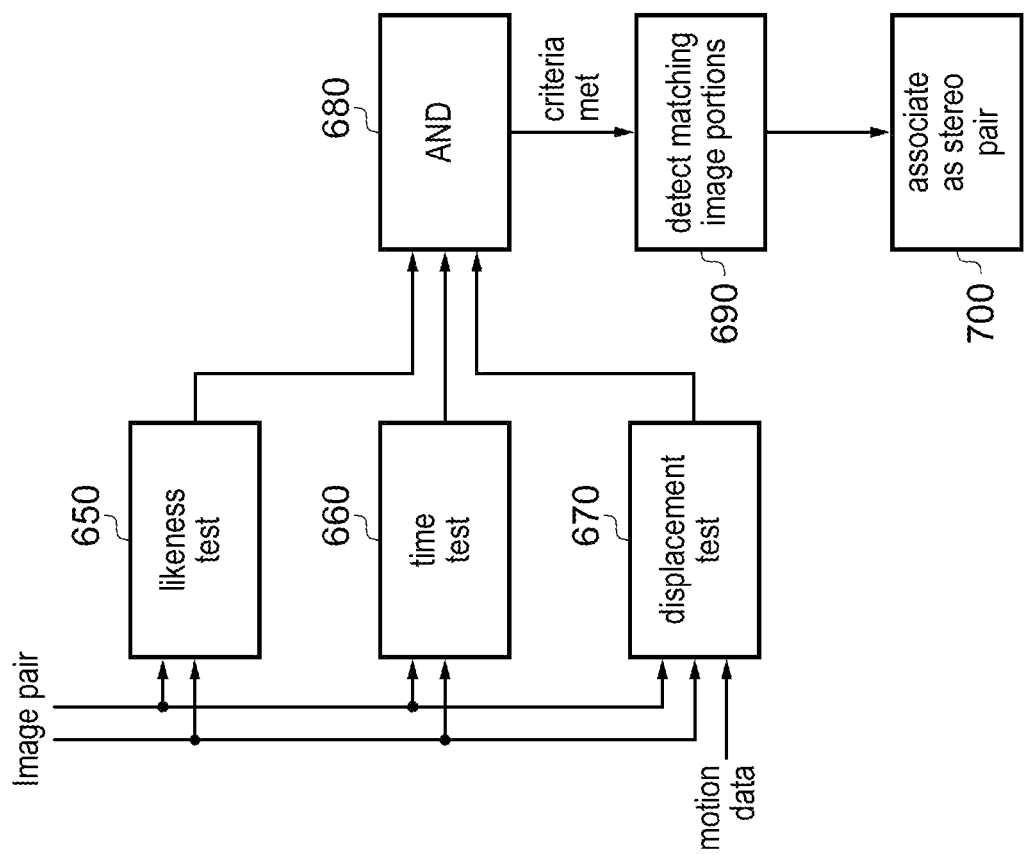
FIG. 10 schematically illustrates an image processor operable to associate stereo pairs of images.

FIG. 10 schematically illustrates a further function of the image processor 510, in which it is operable to associate stereo pairs of images. The image processor can carry out this operation in addition to, or instead of, the image stabilisation process described above. Generally, the process of FIG. 10 would be initiated by the user indicating that he wished to capture a stereo pair of images.

The image processor 510 carries out three tests on a candidate pair of images to detect whether those images or parts of those images should be associated as a stereo pair of images. The tests establish whether the candidate pair of images meet three criteria:

criterion (a): that the two images relate to similar parts of the real environment. This is shown schematically in FIG. 10 as a "likeness" test 650. It is passed if at least a threshold proportion of the two images (e.g. at least 70% by area of each image) matches the content of the other image.

criterion (b): that the two images were captured within a threshold time (e.g. 1 minute) of one another. This test, shown schematically in FIG. 10 as a time test 660, is carried out by examining and comparing metadata associated with each image in a known way (e.g. by using video time code) to establish the time difference between the capture times of the images. It is relevant because a stereo pair looks better when the lighting and image content are as closely related as possible, as between the two images.

criterion (c): that the apparatus (i.e. the video camera) moved by at least a threshold displacement (and, optionally, by no more than another threshold displacement) between the capture of the two images. This test is shown schematically in FIG. 10 as a displacement test 670. For a good stereo pair of images, the displacement between the camera positions of the two images is important. A minimum displacement of, say, 5 cm may be set, and optionally a maximum displacement of (say) 20 metres can be applied. The displacement test is carried out by storing and comparing positional data from the hardware motion processor relating to the times at which the candidate images were captured.

An AND gate 680 combines the results of the three tests 650, 660, 670, so that a candidate pair of images is used only if all three tests are passed.

One or two of the tests can be omitted if desired, but better results are obtained if all three tests are applied in the manner shown.

If the output of the AND gate 680 indicates that all three criteria were met, then an image matcher 690 detects matching image portions between the pair of images, and crops the images (if appropriate) so that the resulting stereo pair represent respective views of substantially the same part of the real environment. Of course, the images do not have to match exactly, because by its very nature a stereo pair contains two subtly different images. Also, if the whole of the two images match within the required limits (e.g. a threshold-based similarity test), a cropping operation is not required.

The resulting images are associated together as a stereo pair by association logic 700.

The tests shown in FIG. 10 can in principle be carried out on each successive pair of images captured by the video camera, but in practice it is unlikely that the user will have been able to move the camera sufficiently far in one frame period, without causing serious image blur. So it is preferred that the tests are carried out on images captured a few seconds apart, or candidate images selected in response to the user operating a control (similar to a shutter button on a stills camera).

Figure 11A:
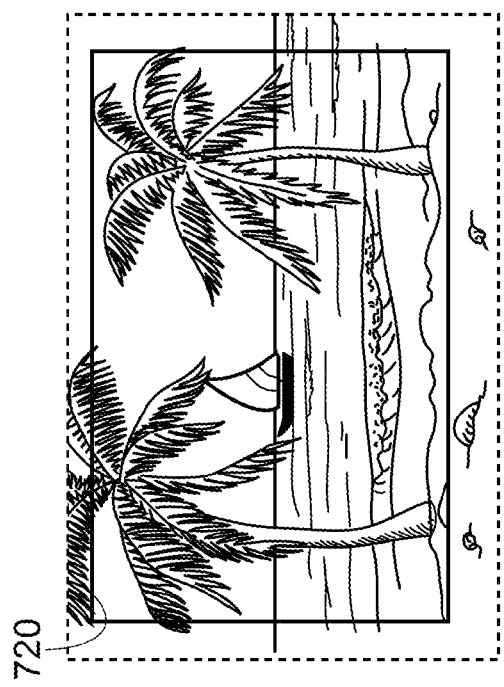
FIGS. 11A to 11C schematically illustrate the operation of the image processor of FIG. 10.
Figure 11B:
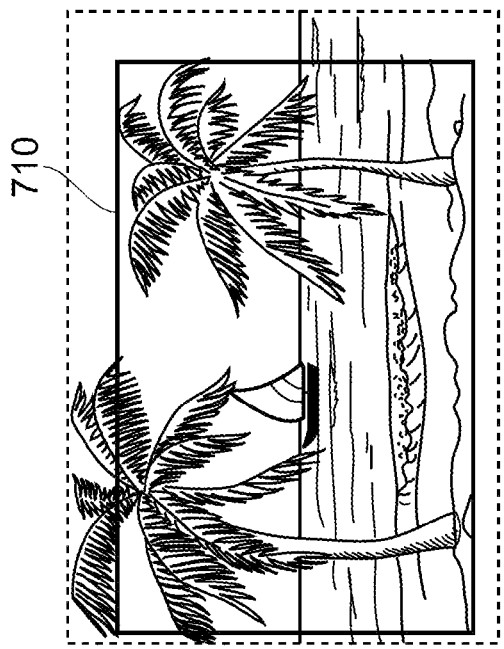
Figure 11C:
Figure 11C:

FIGS. 11A to 11C schematically illustrate the stereo images association process. In particular, FIGS. 11A and 11B schematically illustrate a candidate pair of images captured at times t1 and t2, and positions (x1, y1, z1) and (x2, y2, z2)

respectively. Note that t1 and t2 are different to the t1 and t2 used in connection with FIG. 9.

The two images meet all three criteria (a), (b) and (c). In particular, in this example, the time difference (t2−t1) is within the allowable range; the positional difference, i.e. the magnitude of the vector subtraction (x2, y2, z2)−(x1, y1, z1) is within the allowable range, and at least the threshold proportion of the two images match sufficiently closely. Accordingly, the output of the AND gate 680 is "yes".

The image matcher detects that portions 710, 720 match and can form a stereo pair, so the association logic 700 associates those portions as a stereo pair shown in FIG. 11C.

Figure 12:
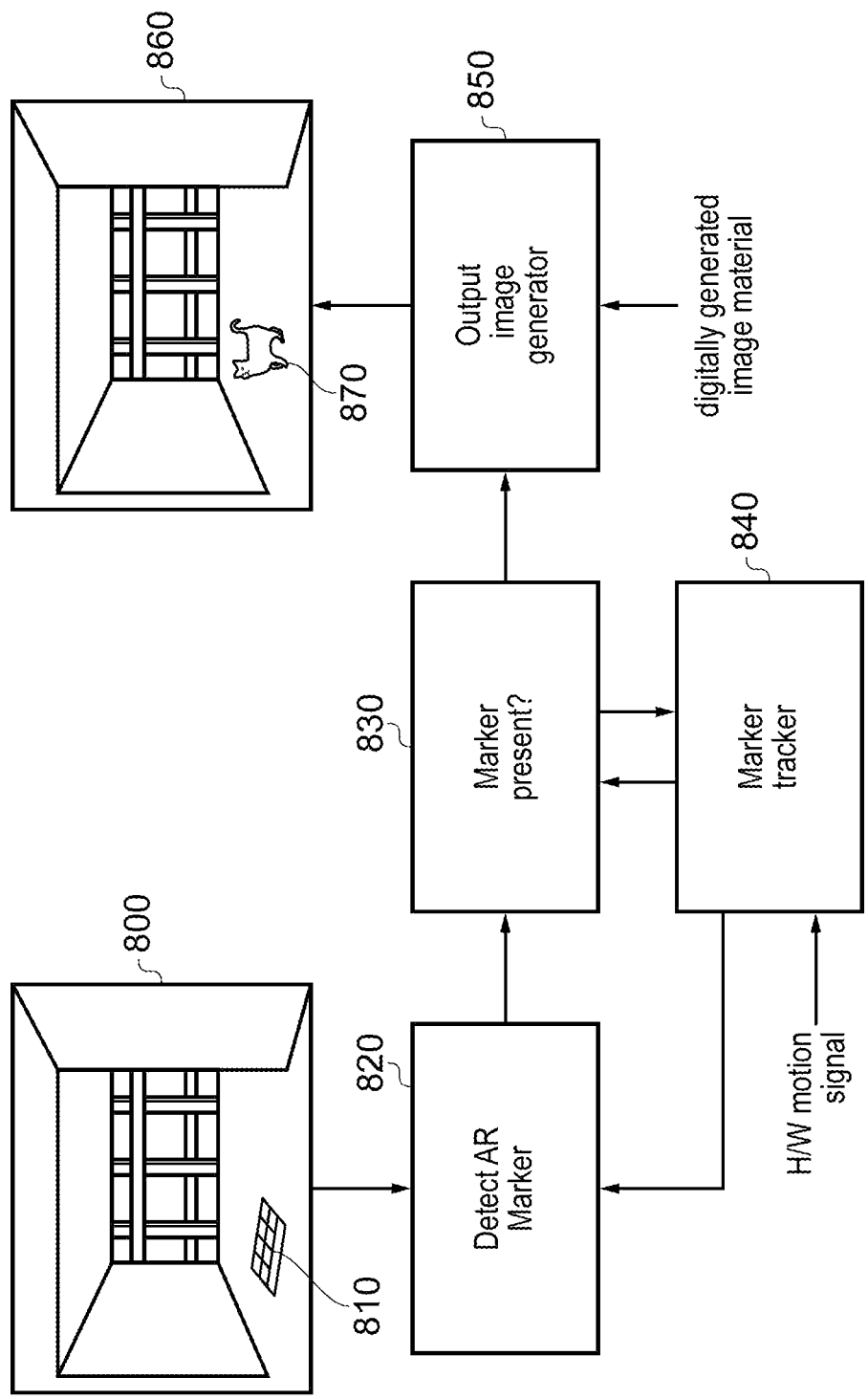
FIG. 12 schematically illustrates an image processor operable to apply augmented reality to captured images.

FIG. 12 schematically illustrates an operation of the image processor 510 to apply augmented reality to captured images. This operation may take place in addition to, or instead of, any of the image processor operations described above. The functions shown in FIG. 12 are carried out by the image processor 510 under appropriate software control.

The video camera 240 captures an image 800 of a real world scene, in this example the interior of a room, with an augmented reality (AR) marker 810 within that scene. The AR marker (or 'marker object') is typically a two-dimensional marker which is large enough to be distinguished in a captured image, and which contains detail such as shapes, bar codes and the like to allow it to be identified either just as an AR marker or (more usually) as a particular AR marker. It is also useful for the viewing device to be able to detect the AR marker at different viewing angles, and indeed to be able to determine the viewing angle from an analysis of the captured shape of the marker in the image. So, a typical AR marker might be an A4 sized black and white card, with a distinctive (e.g. black or white) border and coded markings within the border.

The image processor 510 is operable as an object detector to detect the AR marker at 820. A test is applied at 830 to establish whether the marker has been successfully detected, i.e. is the marker present in the image? (and if so, where?) The results of that test are passed to a marker (or object) tracker 840 and an output image generator 850 which also receives digitally generated image material associated with that marker. Assuming the marker is present, then the output image generator 850 generates an output image 860 comprising most of the captured image but combined with the digitally generated image material (in this example, an image 870 of a small animal) so that in this case it is substituted into the image to take the place of the AR marker 810. In this way, the position and/or nature of the digitally generated material within an output image can be made to depend on the position and/or nature of the captured marker object within said respective captured image.

The test 830 also supplies data to the marker tracker 840. This receives the hardware motion signal and tracks the image position of the marker against motion data indicating motion of the PED (and therefore the camera). If the camera is moved such that the marker is no longer detected within the captured image, the marker tracker maintains an estimate of the expected position of the marker relative to the camera, and in particular what camera motion (e.g. position and orientation) will result in the marker returning into view. The marker tracker then monitors the camera motion and supplies information to the detection process 820 and the test 830 so that if the camera is moving towards the marker again, the marker tracker indicates when and where the marker will reappear in the captured image. In this case, it will be appreciated that the position and/or nature of digitally generated material within an output image can be made to depend on the expected position generated by the object tracker.

Of course, other reasons can prevent the marker being visible in the captured image. It could just be temporarily obscured by another object. This situation is indicated by the marker tracker concluding from the motion signal and its tracking of the marker that the camera is still in fact directed towards the marker. The marker tracker can supply location information to the test 830 so that the AR features appropriate to that marker can still be enabled in the output image, despite the fact that the marker itself is not visible or resolvable.

The marker detection process can also adapt or alter its operation in response to the expected location derived by the marker tracker, in the case where the marker itself either is not part of the image or cannot be resolved in the image. For example, the marker detection process can concentrate a search around the expected position, and/or can use a more detailed or fine resolution search around the expected position, and/or can use more aggressive search techniques (perhaps a lower probability threshold for deciding whether a particular area of the image represents the marker) around the expected position.

The marker tracker therefore operates at least when the marker is newly obscured, through to when it is recaptured. It can, however, operate all the time that the device is carrying out AR based operations.

Finally, it will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Portable data processing apparatus having at least one data processing function which depends on detected motion of the apparatus, the apparatus comprising:
   a video camera operable to capture successive images of a part of a real environment around said apparatus;
   a video motion detector operable to detect motion of said apparatus corresponding to inter-image motion in at least a majority of an image, as detected between pairs of captured images;
   a hardware motion detector operable to detect motion of said apparatus, whereby said data processing function depends on motion detected by said hardware motion detector; and
   a controller operable to adjust operation of said hardware motion detector if the motion detected by said video motion detector and the motion detected by said hardware motion detector differ by at least a threshold difference.

2. Apparatus according to claim 1, in which said controller is operable to reset the operation of said hardware motion detector so as to force a detection of substantially zero motion, in response to a detection that the motion detected by said video motion detector is less than the motion detected by said hardware motion detector by at least said threshold difference.

3. Apparatus according to claim 1, in which said controller is operable to cause said data processing function to use motion detected by said video motion detector in place of motion detected by said hardware motion detector, if the motion detected by said video motion detector and the motion detected by said hardware motion detector differ by at least said threshold difference.

4. Apparatus according to claim 1, in which:
said video motion detector and said hardware motion detector are arranged to detect motion as corresponding sets of motion components;
said threshold difference comprises a respective threshold value applying to each motion component; and
said controller is operable to detect that the motion detected by said video motion detector and the motion detected by said hardware motion detector differ by at least said threshold difference if the difference between any pair of the corresponding motion components exceeds said respective threshold value.

5. Apparatus according to claim 1, comprising an image processor operable to apply said data processing function as an image processing operation to one or more captured images in dependence upon motion of said apparatus as detected by said hardware motion detector.

6. Apparatus according to claim 5, in which said image processor is operable to apply said image processing operation so as to compensate, at least partially, for motion of said apparatus at the time that said one or more images were captured.

7. Apparatus according to claim 5, in which said image processor is operable to detect whether two images meet criteria:
(a) that said two images relate to similar parts of the real environment;
(b) that said two images were captured within a threshold time of one another; and
(c) that said apparatus moved by at least a threshold displacement between capture of said two images;
and, in response to a detection that two images meet all of the criteria (a), (b) and (c), to associate at least parts of said two images as a stereo pair of images.

8. Apparatus according to claim 7, in which, for two images which meet all of the criteria (a), (b) and (c), the image processor is operable to detect portions of said two images which relate to respective views of substantially the same part of the real environment, and to associate those image portions as said stereo pair of images.

9. Apparatus according to claim 1, comprising:
an object detector operable to detect a marker object within said captured images; and
an object tracker operable in case said marker object is not detected with a captured image to track an expected position of said marker object with respect to changes in position and orientation of said apparatus;
in which said object detector is operable to alter its detection of said marker object in response to the expected position.

10. Apparatus according to claim 9, in which said marker object is an augmented reality marker, and said apparatus comprises an image generator operable to generate output images from respective captured images, an output image representing a combination of a respective captured image and digitally generated image material, so that the position and/or nature of the digitally generated material within an output image depends on the position and/or nature of the captured marker object within said respective captured image, or the expected position generated by said object tracker in the case that said marker object is not detected within a captured image.

11. Apparatus according to claim 1, in which said hardware motion detector comprises:
an acceleration detector; and
an integrator for integrating an output of said acceleration detector to generate velocity data indicative of velocity of movement of said apparatus.

12. Apparatus according to claim 11, in which said hardware motion detector comprises a second integrator for integrating said velocity data to generate position data indicative of a current position of said apparatus.

13. Apparatus according to claim 1, in which:
said apparatus is a games machine operable to execute a computer game providing a game environment;
motion of said apparatus as detected by said hardware motion detector forms a control input to control operation, in said game environment, of a game object.

14. A method of operation of a portable data processing apparatus having at least one data processing function which depends on detected motion of the apparatus, the method comprising:
capturing successive images of a part of a real environment around said apparatus;
detecting motion of said apparatus corresponding to inter-image motion in at least a majority of an image, as detected between pairs of captured video images;
detecting motion of said apparatus with a hardware motion detector, whereby said data processing function depends on motion detected by said hardware motion detector; and
adjusting the operation of the hardware motion detector if the motion detected by image analysis and the motion detected by said hardware motion detector differ by at least a threshold difference.

15. A tangible computer-readable storage medium on which computer readable instructions of computer software are stored, the instructions, when executed by a computer, cause the computer to perform a method of operation of a portable data processing apparatus having at least one data processing function which depends on detected motion of the apparatus, the method comprising:
capturing successive images of a part of a real environment around said apparatus;
detecting motion of said apparatus corresponding to inter-image motion in at least a majority of an image, as detected between pairs of captured video images;
detecting motion of said apparatus with a hardware motion detector, whereby said data processing function depends on motion detected by said hardware motion detector; and
adjusting the operation of the hardware motion detector if the motion detected by image analysis and the motion detected by said hardware motion detector differ by at least a threshold difference.

* * * * *

UNITED STATES PATENT AND TRADEMARK OFFICE
CERTIFICATE OF CORRECTION

| | |
|---|---|
| PATENT NO. | : 8,477,099 B2 |
| APPLICATION NO. | : 12/979661 |
| DATED | : July 2, 2013 |
| INVENTOR(S) | : Jonathan Webb et al. |

It is certified that error appears in the above-identified patent and that said Letters Patent is hereby corrected as shown below:

Title Page, [54], "APPARTATUS" should read --APPARATUS--

Signed and Sealed this
Fifth Day of May, 2015

Michelle K. Lee
*Director of the United States Patent and Trademark Office*

UNITED STATES PATENT AND TRADEMARK OFFICE
CERTIFICATE OF CORRECTION

PATENT NO. : 8,477,099 B2  Page 1 of 1
APPLICATION NO. : 12/979661
DATED : July 2, 2013
INVENTOR(S) : Jonathan Webb et al.

It is certified that error appears in the above-identified patent and that said Letters Patent is hereby corrected as shown below:

Title Page, [54], and in the Specification, Column 1, line 2 "APPARTATUS" should read --APPARATUS--

This certificate supersedes the Certificate of Correction issued May 5, 2015.

Signed and Sealed this
Seventh Day of July, 2015

Michelle K. Lee
*Director of the United States Patent and Trademark Office*